US011982632B2

(12) United States Patent
Al-Mansour (10) Patent No.: US 11,982,632 B2
(45) Date of Patent: May 14, 2024

(54) SYSTEM AND METHOD FOR INTERNAL COATING OF OFFSHORE PIPELINE WELD JOINTS WITH FLUORESCENT ANTI-CORROSION COATINGS AND WET INSPECTION

(71) Applicant: Saudi Arabian Oil Company, Dhahran (SA)

(72) Inventor: Mana H. Al-Mansour, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 299 days.

(21) Appl. No.: 17/314,388

(22) Filed: May 7, 2021

(65) Prior Publication Data

US 2022/0357284 A1  Nov. 10, 2022

(51) Int. Cl.
| | | |
|---|---|---|
| *G01N 21/95* | (2006.01) | |
| *B05B 13/06* | (2006.01) | |
| *B05D 7/22* | (2006.01) | |
| *F16L 55/32* | (2006.01) | |
| *F16L 58/10* | (2006.01) | |
| *F16L 58/18* | (2006.01) | |
| *G01N 21/954* | (2006.01) | |

(Continued)

(52) U.S. Cl.
CPC ........... *G01N 21/954* (2013.01); *B05D 7/225* (2013.01); *F16L 55/32* (2013.01); *F16L 58/1027* (2013.01); *F16L 58/181* (2013.01); *F16L 2101/16* (2013.01); *F16L 2101/30* (2013.01); *G01N 2021/9548* (2013.01); *G01N 2201/101* (2013.01); *G01N 2201/102* (2013.01)

(58) Field of Classification Search
USPC ........ 118/306, 317, 321, 323, 712, 713, 665
See application file for complete search history.

(56) References Cited

U.S. PATENT DOCUMENTS

| 8,633,713 B2 | 1/2014 | Langley et al. |
| 8,800,396 B2 | 8/2014 | Langley et al. |
| (Continued) | | |

FOREIGN PATENT DOCUMENTS

| CN | 208476790 U | 2/2019 |

OTHER PUBLICATIONS

Schultz, Mark et al., "Advanced Tank Coating Solutions for the Marine Sector", The Society for Protective Coatings. 35 pages.

*Primary Examiner* — Yewebdar T Tadesse
(74) *Attorney, Agent, or Firm* — Leason Ellis LLP (57) ABSTRACT

A system and method for coating marine pipeline weld joints and wet inspection of the applied coating is provided. The coating system includes an anti-corrosion coating including a fluorescent pigment to enhance inspection of the applied coating. The system also includes a robotic crawler for traversing inside the pipe and carrying a coating apparatus and inspection apparatus respectively configured to apply the coating on the weld joints and facilitate inspection of the wet coating. The coating apparatus comprises a spraying nozzle provided on a forward end of the robotic crawler and configured to spray coating onto on the surrounding circumferential pipe surface. The inspection apparatus includes an ultraviolet radiation emitter for activating the fluorescent pigment in the coating and a camera for providing a live image feed of the coated weld joint area to an operator computing station for inspection of the applied coating.

7 Claims, 5 Drawing Sheets

(51) Int. Cl.
*F16L 101/16* (2006.01)
*F16L 101/30* (2006.01)

(56) References Cited

U.S. PATENT DOCUMENTS

| | | |
|---|---|---|
| 10,260,860 B2 | 4/2019 | Ponomarev |
| 2012/0172507 A1* | 7/2012 | Weisenberg ............ C08G 18/36 524/312 |
| 2017/0138526 A1 | 5/2017 | Goto et al. |
| 2019/0285555 A1* | 9/2019 | Kueny ................ G01M 5/0025 |
| 2021/0114278 A1* | 4/2021 | Holle ..................... G01B 11/24 |
| 2022/0001548 A1* | 1/2022 | Abdelkader ............ B05C 21/00 |

\* cited by examiner

SYSTEM AND METHOD FOR INTERNAL COATING OF OFFSHORE PIPELINE WELD JOINTS WITH FLUORESCENT ANTI-CORROSION COATINGS AND WET INSPECTION

FIELD OF THE DISCLOSURE

The present disclosure is directed to in-pipe processing technology and more particularly, relates to a mobile robotic system and method for performing weld joint surface coating and wet coating inspection inside of an offshore pipeline.

BACKGROUND OF THE DISCLOSURE

In a number of industries, extensive infrastructure is installed in harsh environments. Prolonged exposure to weathering conditions in such environment can cause structural degradation. For example, pipes used in the oil industry in offshore/marine environments are subject to prolonged exposure to infiltration by salt water, which cause the surfaces of these structures to corrode and degrade.

It is with respect to these and other considerations that the present disclosure is presented.

SUMMARY OF THE DISCLOSURE

According to an aspect of the present disclosure, there is provided a system for coating and wet coating inspection of a weld joint in a marine pipeline. The system comprises a first robotic device having a body including a drive mechanism for driving the robotic device along an internal surface of the pipeline in a direction of travel. The first robotic device has a forward end and a tail end. A coating application tool is supported by the body. The coating application tool comprises a spray nozzle provided near the forward end of the robot and is configured to spray a marine pipeline anti-corrosion coating formula including a fluorescent pigment in at least a radial direction relative to the axis of the pipeline and onto a surrounding surface of the pipeline. Additionally, the spray nozzle of the coating application tool is provided at a position forward of the drive mechanism that contacts the internal surface.

An inspection apparatus is also supported by the body. The inspection apparatus comprises a light emitter and a camera provided near the forward end of the robot and at a respective position forward of the drive mechanism that contacts the internal surface. The light emitter is configured to illuminate the surrounding surface with ultraviolet (UV) light. The camera is configured to capture a live feed of images of the surrounding surface and transmit the live feed to a remote main controller computing device for real-time display and identification of any defects in the wet coating.

According to a further aspect of the present disclosure, a method for coating and wet coating inspection of a weld joint in a marine pipeline is provided. The method comprises the step of providing a first robotic device. In particular, the first robotic device has a crawler body having a forward end and a tail end and including a drive mechanism for supporting and driving the first robotic device along an internal surface of the pipeline in a direction of travel. Additionally, a coating application tool is supported by the body. The coating application tool comprises a spray nozzle extending from the forward end of the first robotic device and is configured to spray a marine pipeline anti-corrosion coating formula including a fluorescent pigment in at least a radial direction relative to the axis of the pipeline and onto a surrounding surface of the pipeline. An inspection apparatus is also supported by the body. The inspection apparatus comprises a light emitter and a camera provided near the forward end of the robot. The light emitter is configured to illuminate the surrounding surface with UV light. The camera is configured to capture a live feed of images of the surrounding surface.

The method further includes the step of driving the robot through the pipeline in a forward direction to a location of a first weld joint and applying, with the nozzle, the coating formula onto the weld joint and surrounding surface. In particular, the coating formula is applied from the nozzle provided at a position forward of the drive mechanism that contacts the internal surface. The method also includes the step of illuminating, with the light emitter, the wet coating applied to the weld joint and surrounding surface and capturing, with the camera, a real time feed of images depicting the wet coating applied to the weld joint and the surrounding surface. Moreover, the images are captured while performing the illuminating step and wherein the light emitter and camera are provided at a position forward of the drive mechanism that contacts the internal surface. Additionally, the method includes the step of transmitting the real time feed of images to a remote main controller computing device for coating evaluation. Furthermore, subject to a result of the evaluation, the method includes the step of driving the robot in the rearward direction to a subsequent weld joint and repeating the applying, illuminating, capturing and transmitting steps for the subsequent weld joint.

These and other aspects, features, and advantages can be appreciated from the accompanying description of certain embodiments of the disclosure and the accompanying drawing figures and claims.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

DESCRIPTION OF CERTAIN EMBODIMENTS OF THE DISCLOSURE

Broadly speaking, the present disclosure is directed in-pipe processing technology and more particularly, relates to an improved system for internally coating weld joints of offshore pipelines using a mobile robotic system that facilitates the coating and inspection inside of the pipe during installation of the pipeline.

Metallic (e.g., carbon steel) pipelines are generally assembled in the field using girth welding techniques. Traditionally, pipes are delivered to the construction (installation) site in 12 meter sections that are pre-coated both internally and externally, except at the joint locations. These pipe sections are then welded together in the field (field girth welding) to form pipe strings (pipelines) of hundreds of meters. This involves the welding together of abutting pipe ends with the weld bead protruding into the interior of the pipe, filling the entire gap between the abutting ends, and extending to a weld bead head on the outside of the joint around the entire girth of the weld. Upon completion of the girth welds, the welded joint and the surrounding surface of the pipe area must be coated to prevent corrosion at the joint. In such cases, robotic crawlers are used to reach the internal girth welds inside pipelines of hundreds of meters to perform the coating task. The in-pipe girth weld coating process is a very complicated mission that requires multiple subtasks to be performed in succession. In the installation of underwater pipelines, after a new section of pipe is added to the pipeline, the pipeline is advanced forward relative to the assembly location (e.g., toward the water by 12 meters) such that the next pipe section can be joined and coated for deployment.

Preferably, the coating applied to the weld joint is also inspected or tested to confirm that the coating is free of defects such as holidays, pin holes, has at least a minimum thickness, and the like. However, existing coating inspection techniques and the robotic devices on which inspection equipment is mounted can require the coating to be dry before inspection can be performed. This drying time introduces delay into the production process. For instance, a dry film thickness (DFT) sensor can require a dry film coating to perform thickness testing. By way of further example, the configuration of some robotic systems for performing various operations (e.g., surface preparation, coating and/or inspection) can require the system to be driven over the coatings to perform the various operations, which can damage the coating, particularly when wet.

As part of the offshore pipeline assembly process, a robotic device is introduced into the inside of the pipeline in order to perform various operations. More specifically, in an embodiment, the in-pipe coating robot technology primarily utilizes a train of robotic modules that each perform the tasks of, for example and without limitation, surface preparation, coating, and inspection. The system can be controlled manually by a human operator, operate autonomously or a combination of the foregoing with certain operations being performed by the robot autonomously and other operations such as wet inspection requiring manual control. For example, to perform surface preparation of the weld joint for coating, the robot is driven and positioned either manually or autonomously with respect to the weld's area of interest, using visual feedback from an onboard camera and light emitter positioned on one or more of the robotic modules. After the task is completed, the train is driven either manually or autonomously such that the coating robot, or module, is positioned with respect to the same weld area that was prepared. Similarly, the train can be repositioned for the coating inspection task, in which inspection module comprising a UV light emitter and camera is positioned and moved relative to the coated surface to enable the operator to perform visual inspection via a live video feed displayed at a remote control computing station.

The automated mobile robotic system allows for optimized deployment of the robotic devices that perform the various tasks required for coating pipes in the field and enhanced wet inspection of the coating. More specifically and according to an embodiment, the coating system and method are configured for applying an improved fluorescent anti-corrosion coating to enhance inspection of the internal coating of offshore pipeline weld joints (also referred to as field joints). The improvement is characterized at least by: the addition of a fluorescent pigment (e.g., a fluorescing optically active pigment that glows or emits light when irradiated with ultraviolet light) to an anti-corrosion coating formula used for coating weld joints in underwater pipelines; and configuring a coating application and inspection robot to perform application of the coating on the weld joints and facilitate inspection of the coated weld joints. The configuration of the inspection robot, or module, includes the inclusion of an ultraviolet (UV) radiation emitter, a 360-degree field-of-view camera delivers a live image feed to a human observer/inspector to facilitate inspection of the applied coating, and the arrangement of these and other components of the robot in relation to the robotic coating application system.

The improved coating and inspection solution of the present disclosure further includes a method for coating and wet inspection of pipeline weld joints for offshore pipeline installation projects. The method is performed using a robotic device having a body (e.g., a chassis) and a drive mechanism to negotiate the robot through the pipeline in a direction of travel. The body having a forward end and a tail end, wherein the forward end is inserted first inside the pipeline and the tail end being closer to the open end of the pipeline. The robot further includes a battery cart, cleaning equipment, an inspection apparatus and a coating application apparatus. The coating applicator is located at the forward end of the robot, followed by the inspection apparatus, the cleaning equipment, and the battery cart, which is located at the tail end of the robot. While not specifically discussed herein, it should be understood that the robotic train can include additional surface preparation robots, or modules, such as a grinding module provided rearward of the cleaning module. During the coating process of the offshore pipeline weld joint, the robot will move forward inside the pipe to stop at the weld joint area to be coated and conduct a cleaning operation first, where the coating applicator and inspection apparatus already crossed that area. Once the cleaning is completed, the robot will move backward to apply the fluorescent pigmented coating on the weld joint using a 360 degree spraying disc. After that, the inspection apparatus comprising a UV light emitter and a camera is positioned relative to the coated area. The UV emitter is configured to illuminate the surrounding coated pipeline surface with UV light, and the camera is configured to capture a live 360 degree video feed of the surrounding surface that is transmitted to an operator's remotely located main control computing device for display in near-real-time on a display and to enable visual inspection. After completion of the coating and passing inspection of the joint, the pipes will be moved forward for laying in the seawater and the robot will move backward (i.e., the direction away from the recently coated joint toward the proximal, open end) to coat and inspect the next joint. If the UV light-based wet inspection of the coated joint reveals that the coating has a thickness that is below a prescribed thickness, holidays, pin holes or other such coating defects, the defect can be repaired immediately by adding additional layer of coating using the coating applicator, prior to the robotic train moving backward.

Figure 1:
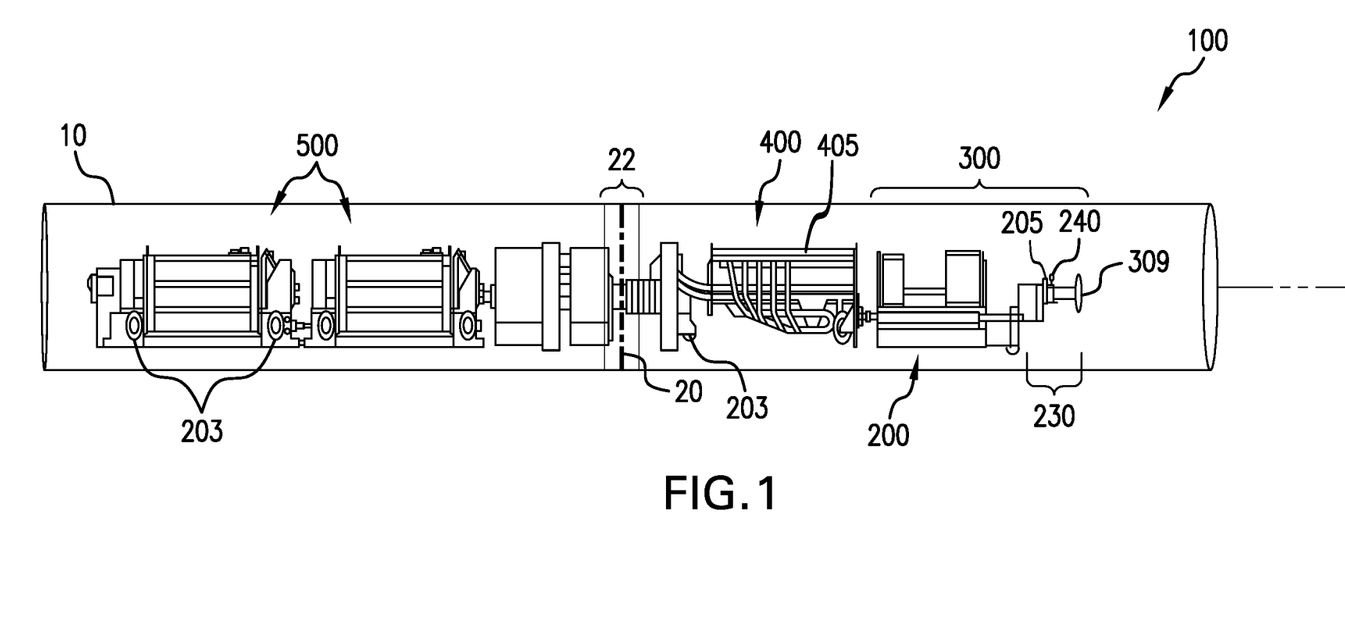
FIG. 1 is a side elevation view of a pipe formed of two segments with a girth weld joint formed therebetween and an in-pipe robotic system for coating and wet coating inspection of the weld joint is illustrated within the pipe, according to an embodiment.

FIGS. 1-4 illustrate an exemplary automated mobile robotic system 100 that is configured to drive within a pipeline 10 and perform a multitude of operations including, to coat weld joints 20 and facilitate wet coating inspection of the in-pipe coating that covers one of the weld joints 20. FIG. 1 illustrates a length of pipeline 10 that is formed of two pipe segments that interface at and are joined at a weld joint 20. The weld joint 20 is thus the location at which a girth weld is formed to sealingly join the two pipe segments. Since the pipeline 10 is formed of a number of interconnected pipe segments, the pipeline can contain a number of weld joints 20. As noted, pipe sections are pre-coated both internally and externally, except at the joint locations. Thus, after completion of the girth welds, the circumferentially welded joint and the surrounding surface of the pipe must be coated to prevent corrosion at the joint.

In one embodiment, the system 100 is positioned relative to a weld joint and then performs a cleaning operation, followed by a coating operation. Coating is followed by a wet coating inspection operation, such as to detect any defects (e.g., thin coating or holidays or holes), and then subsequently recoat at least the area at which the defect was detected. In some embodiments, additional processing can be performed by the system 100 such as surface preparation of the weld joint.

The automated mobile robotic system 100 comprises a train of robotic devices that has a first end (also referred to as the front, forward, internal end) and an opposite second end (also referred to as the tail, rearward, or external end). The first end can represent the front end of the system 100 that is further inside the pipeline, while the second end can represent the tail end of the system 100 closer to the proximal end of the pipeline to which segments of pipe are being added. The robotic system includes one or more drive mechanisms. The drive mechanism can include one or more wheels or the like that contact the internal surface of the pipeline 10, support the robotic system, and allow it to travel within the inside of the pipe. The drive mechanism can comprise one or more wheels that are actively driven or passively rolling. As shown in FIG. 1, the system 100 can include a number of robotic modules that are tethered together as a train and can move as a unit. Alternatively, the system 100 can be constructed as a single device that performs multiple operations.

Figure 2:
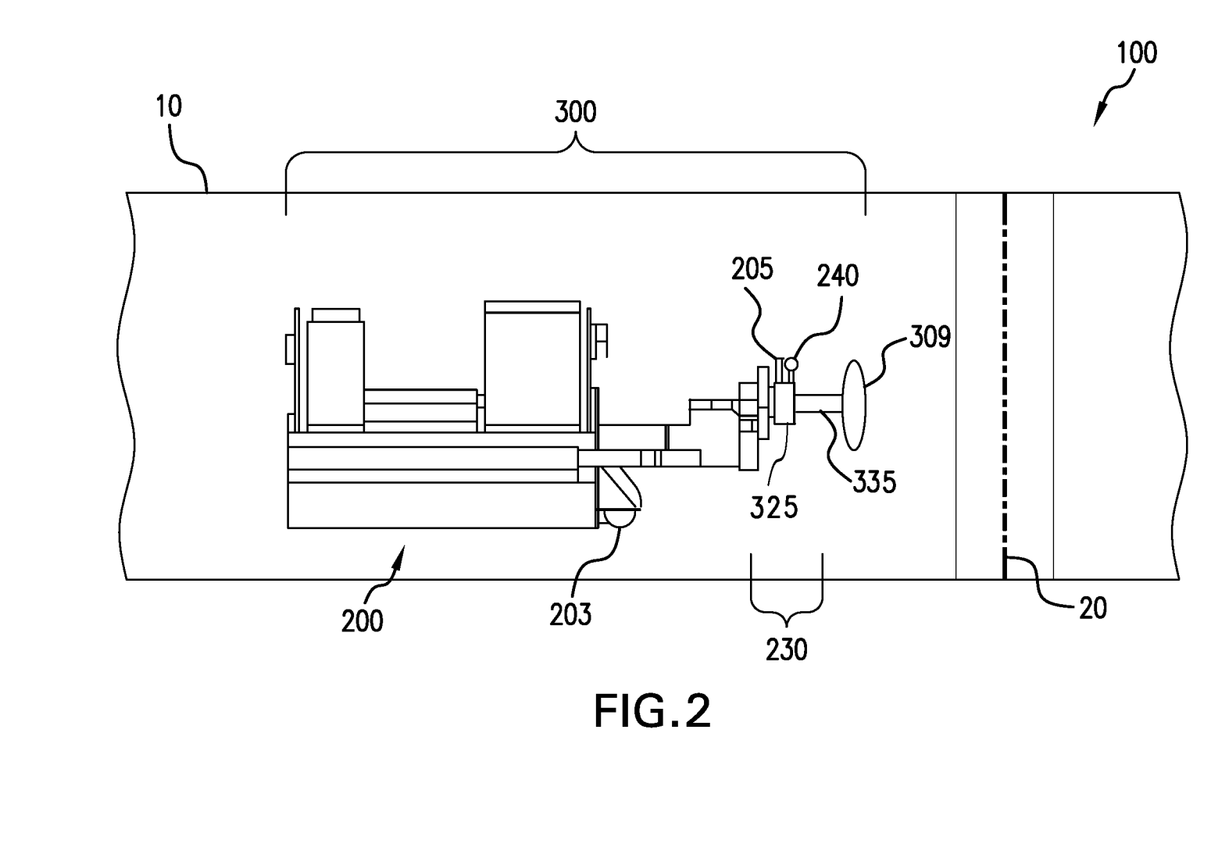
FIG. 2 is a side elevation view of a robotic device including a coating and inspection system that is part of the system illustrated in FIG. 1, according to an embodiment.
Figure 3:
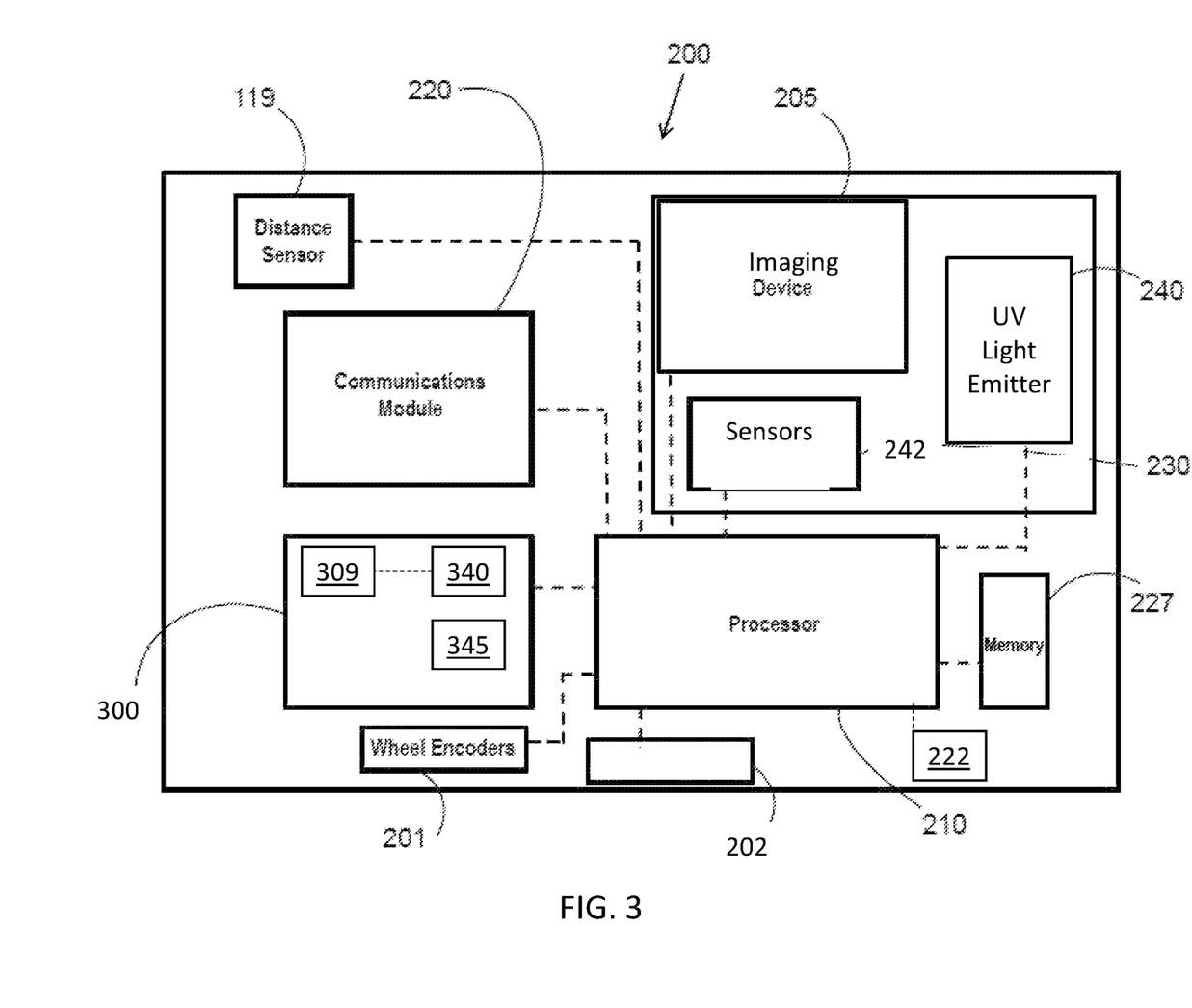
FIG. 3 is a block diagram illustrating exemplary hardware components of the robotic device of FIG. 2, according to an embodiment.

The system 100 includes a plurality of robotic crawler devices on which a plurality of modules for performing respective operations are provided. In an embodiment, located at the front end of the train is a first robotic (crawler) device 200 comprising a coating apparatus 300 and an inspection apparatus 230 that are mounted to a body of the first crawler device. A second robotic (crawler) device 400 comprising a surface preparation and cleaning apparatus is coupled to and follows the first robotic crawler. A third robotic (crawler) device 500 comprising one or more carts of batteries for powering the various components of the system 100 is located at the tail end of the train. FIG. 2 is a schematic diagram providing a close-up side view of the first robotic device 200, as shown in FIG. 1. FIG. 3 is a conceptual block diagram illustrating an exemplary configuration of the first robotic device 200.

Although not shown, the system 100 can include additional robotic devices and operational modules. Additionally, while some of the robotic devices are described as being configured to perform one operation (e.g., the second robotic device comprising the surface preparation and cleaning apparatus), it will be appreciated a single robotic device can comprise multiple operational modules to perform more than one operation or task. Similarly, multiple modules provided on a single robotic crawler device (e.g., the coating application apparatus 300 and inspection apparatus 230 on the first robotic device 200) can in some embodiments be provided on respective robotic devices.

The coating apparatus 300 is configured to coat the weld joint 20 and the uncoated surface area 22 inside the pipe surrounding the weld joint. The coating apparatus is further configured to, as a result of the detection of any defects, recoat the area 22, in its entirety, or in a localized area of the coating identified as having a defect. The inspection apparatus 230 is configured to facilitate the inspection of the wet coating applied to the weld joint for the detection of defects, such as a thin coating or a holiday.

Figure 4:
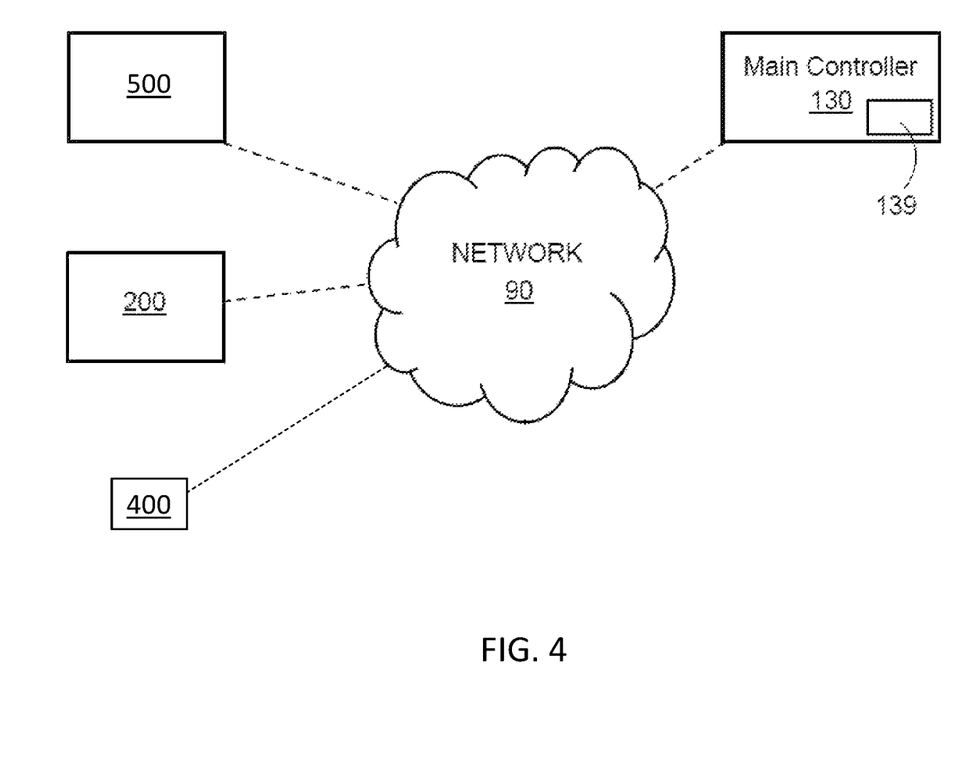
FIG. 4 is a block diagram illustrating an exemplary network configuration of devices of the in-pipe robotic system of FIG. 1, according to an embodiment.

With continued reference to FIGS. 1-3, FIG. 4 is a block diagram illustrating an exemplary network configuration of the various devices of the in-pipe robotic system 100, according to an embodiment. As described herein, the system 100 includes one or more controllers that can be on board the respective robotic devices (e.g., 200, 400 or 500) and/or respective robotic operational modules. The on-board controllers are computing devices configured to implement the features and functionalities of the operational modules. As shown in FIG. 4, each of the robotic devices 200, 400, 500 can include one or more controllers that are configured to communicate over a communications network 90 to allow information to be communicated both between the robotic devices and between the various devices and a main controller 130 computing device that is typically located outside the pipeline 10. These details are described in more detail herein. This arrangement allows for the operator to view substantially in real-time images and/or live video feed of the weld joint area 22, as well any data and measurement taken at the weld joint and also allows the operator to control certain movements of the various devices if necessary.

Various forms of computing devices are accessible to the network 90 and can communicate over the network 90 to the various machines that are configured to send and receive content, data, as well as instructions that, when executed, enable operation of the various connected robotic devices within the pipeline 10. The content and data can include information in a variety of forms, including, as non-limiting examples, text, audio, images, and video and/or machine executable instructions. In relevant part, each computing device has one or more processors, a computer-readable memory that stores code that configures the processor to perform at least one function, and a communication interface for connecting to the network 90, or directly communicating with another device through a wired or wireless communication connection. The code can comprise one or more programs, libraries, functions or routines which, for purposes of this specification, can be described in terms of a plurality of software modules, residing in a representative code/instructions storage, that implement one or more parts of the processes described herein. As described herein, each of the robotic devices (tools) has a controller (processor) and thus, comprises one form of the above-described computing device.

Further, computer programs (also referred to herein, generally, as computer control logic or computer readable program code), such as imaging or measurement software, can be stored in a main and/or secondary memory and implemented by one or more processors (controllers, or the like) to cause the one or more processors to perform the functions of embodiments described herein. In this document, the terms "memory," "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

The main controller 130 can include a user interface 139 that can be provided to allow for remote control over the system 100. The user interface 139 can include a display device for visually outputting information. The user interface can also include one or more user input devices such as keyboards or mouse devices for providing inputs to the main controller 130. The user interface can also include an interactive display, such as a touch screen display to allow user input to be registered and then steps are taken by the processor. The user interface can comprise a graphical user interface (GUI).

Returning now to FIGS. 1-3, as mentioned, the first robotic device 200 is configured to controllably travel within the inner confines of the pipe string (pipeline) 10 and travel to a specific location(s) within the pipeline 10 such as each girth weld joint 20. Accordingly, one or more of the robotic devices can include a drive mechanism that allows the train of devices to controllably travel within the pipeline 10. In an embodiment, the first robotic device 200 can include a drive mechanism 202 that allows the first robotic device 200 to traverse and travel within the pipeline 10. The drive mechanism 202 can consist of any number of different conventional drive mechanisms and generally includes drive wheels 203 or continuous tracks (e.g., tank treads) that surround drive wheels. One or more motors 222, such as an electric motor (e.g., a DC servomotor) can be used and is connected to a power source, such as a battery, that powers the motor as well as other electronics contained onboard the first robotic device 200. In this manner, the first robotic device 200 can be driven to a precise location within the pipeline 10. In addition or alternatively, the drive mechanism of the first robotic device can comprise one or more wheels, or the like, that are passively driven along the pipe surface due to being pushed or pulled by a powered drive mechanism located on another robotic device of system 100 (e.g., device 400 or 500) or external force (e.g., gravity or other external force being applied on the system).

The first robotic device 200 has an onboard computer that includes a main processor 210 that is operatively connected to an imaging device 205, as well as other sensors and electronics described herein. The main processor 210 can be operatively connected to a communications module 220 that permits instructions and data, images, video feeds, etc. to be communicated between the processor 210 and the main controller that is typically located outside the pipeline 10 and can be part of a computing device (e.g., main controller 130) that has a display on which the profile data, images, video feeds, etc. can be displayed. Memory 227 is preferably provided as part of the first robotic device 200.

As mentioned above, the first robotic device 200 can comprise a coating apparatus 300 configured to spray (deliver) the coating material onto the inside surface of the pipeline 10. In an embodiment, the coating apparatus 300 is a liquid coating spraying apparatus. As is known, such a spraying apparatus would typically include a coating reservoir and pumping system, among other components for the delivery of the coating from the reservoir through a coating nozzle 309. In an embodiment, the nozzle 309 can comprise a spraying disc (see FIG. 1-2). The spraying disc is configured to atomize and direct coating radially outward onto the surrounding pipe surface in a 360 degree ring-shaped spray pattern relative to the central axis of the disc. As shown in FIG. 1, the disc shaped spraying nozzle is mounted such that it is located at the forward end of the first robotic device 200 and positioned such that the central axis of the disc is preferably located at or near the central axis of the pipeline 10 and oriented along the central axis of the pipe.

In an exemplary practical application, the bandwidth of the girth weld and surrounding area to be coated is typically around 203 mm (8 inches) in length in the axial direction. Accordingly, in an embodiment, the robot is configured to move within the pipe to position the spraying nozzle at the mid-point of the area to be coated (e.g., with 4" of uncoated surface extending axially forward of the disc and 4" of uncoated surface extending rearward of the nozzle). The spraying nozzle is configured to move back and forth, with no need for the robot to move during the coating application. For example, in an embodiment, the nozzle is mounted to the end of a shaft actuated by a linear actuator 345, wherein the linear actuator is configured to extend and retract the spraying nozzle in the axial direction during coating. For example and without limitation, in an embodiment, the spraying nozzle is controllably extended forward to coat the forward four inches and then retracted backward coating the whole eight inch girth weld area 22. In practice, the required coating thickness can be achieved in six to eight oscillating strokes, for example.

Furthermore, the coating nozzle 309 can be an actuated coating nozzle configured to be rotationally actuated using a motor 340 with an encoder (e.g., rotary encoder, not shown) which provides accurate feedback of the angle of the coating nozzle and thus the radial direction of the spray. For example and without limitation, the spraying disc can comprise a disc shaped nozzle with holes spaced along the circumferential edge of the disc through which the coating is sprayed radially. The coating application will be substantially at 90 degrees relative to the axis of the disc. Accordingly, the disc is preferably rotated during coating to achieve a uniform distribution of coating. For example, and without limitation, during the coating application process, the spraying disc can be rotating at a speed of 3000-4000 RPM (Revolutions Per Minute). At the same time, the disc is moved axially back and forth to achieve the required coating thickness over the entire area 22. In such a configuration, the coating nozzle can be mounted to a shaft 335 that is coupled to the motor which permits controlled rotation of the coating nozzle in addition to the linearly actuated motion of the shaft. The nozzle control motor and linear actuator can be instructed by the processor 210, for instance, to rotationally and linearly sweep over the inner surface of the pipeline 10 along the weld joint 20 to allow for precise directing of the spray from the coating nozzle 309 onto the surrounding surface area that is to be coated or recoated.

As noted, the coating comprises an organic or inorganic fluorescing optically active pigment, which glows or emits light when irradiated with ultraviolet light, combined with an anti-corrosion coating mixture suitable for the protection of pipeline weld joints in a marine pipeline environment. For example, and without limitation, the fluorescing pigment can comprise one or more of zinc sulfide and cadmium sulfide, both of which are stable pigments that can handle aggressive operating conditions. These fluorescent pigments can be added to a novolak epoxy coating formula that is suitable for the protection of marine pipeline weld joints. A novolak epoxy is a low molecular weight polymer derived from phenols and formaldehyde useful as a lacquer coating. The fluorescent pigment and anti-corrosion coating is specifically formulated for a marine pipeline application in which the pipeline is not typically operating at atmospheric conditions, rather, an immersed condition and subjected to water, gas and oil.

Coating inspection is important in order to confirm that the coating is free of potential deficiencies, such as holidays. Additionally, wet inspection can be preferable to improve the speed and efficiency of the weld joint preparation and coating processes and overall marine pipeline construction process. Thus, the first robotic device comprises a coating inspection apparatus 230 that can facilitate the inspection of the coating that is applied to cover the weld joint area 22 of the pipe while. In particular, the coating inspection apparatus 230 is configured to provide images and/or live video that can aid in detecting defects in the coating within the pipeline 10 when wet or dry.

The coating inspection apparatus 230 comprises at least one imaging device 205 which is configured to capture an image of the inside surface of the pipeline 10. The at least one imaging device 205 can be in the form of a camera and more particularly, a digital camera. The imaging device can be of the type that is capable of capturing wide angle imagery or, more preferably, one or more images providing a field of view that extends 360 degrees around the longitudinal axis of the pipe and forward and backward in the axial direction (hereinafter "360 degree imagery"). Put another way, the imaging device 205 is preferably configured to capture images or video showing the entire circumferential surface of the pipe surrounding the robot including the girth weld joint 20 and surrounding area 22. For example, in an embodiment, the imaging device 205 can be a live video camera that is configured to be rotated 360-degrees during image capture in order to capture the "360 degree image" of the surrounding surface. Additionally, in some embodiments, the camera can be held at any angle in order to capture a picture of a specific location, if needed.

The imaging device 205 can be configured to output, via the processor 210 and communications module 220, a feed of images, such as a continuous digital video stream or sequence of digital images, showing the surrounding weld joint area 22 and any coating applied thereon. A real time stream thus can be provided by the imaging device 205 and can be viewed by an operator at the main controller 130 to perform quality inspection of the coated surface. The imaging device 205 preferably has an image sensor (e.g., a CMOS or CCD sensor) that is capable of sensing one or more wavelengths of light including at least the wavelength of light that is emitted by the fluorescent pigment included in the coating when activated. The imaging device can also be configured to capture radiation having wavelength(s) in one or more of the visible light spectrum, infra-red (IR) spectrum, near-IR spectrum, among others. In an embodiment, the imaging device preferably is configured to capture radiation having a wavelength between 320 nm to 400 nm.

In an embodiment, the inspection process involves rotating the camera 360 degrees about the longitudinal axis of the pipe while capturing video and/or pictures. This process can be performed before, during or after the completion of wet inspection at the remote terminal. Preferably the field of view of the camera is sufficient to capture images showing at least the entire axial length of the girth weld and surrounding portion 22 of the pipe (e.g., eight inches in the axial direction). The field of view is also sufficient to capture at least a portion of surrounding surface that extends in the circumferential direction. For instance, the camera can capture a 25, 35, 45, 60, 90, or 180 degree window. Accordingly, in an embodiment, the image capture process can comprise the camera being moved to a prescribed starting position, for instance, the 12 o'clock position, and controllably rotated 360 degrees to capture the entire surrounding circumference of the pipe.

In some embodiments, when positioned toward the front end of the first robotic device 200, the imaging device 205 can also be configured to capture images looking forward into the pipeline 10, say, as the system 100 drives within the pipeline 10. In some embodiments, the images can also be fed to at least one on-board computer 210 that is associated with the first robotic device 200 to facilitate automated positioning coating and/or inspection operations.

Additionally, the coating inspection apparatus 230 further comprises one or more light emitters 240 configured to illuminate the surrounding area of the pipeline being imaged using the imaging device 205. Preferably, the one or more light emitters includes a UV light emitter 240 configured to irradiate the surrounding walls of the pipe with UV light that causes the fluorescent pigment in the coating to fluoresce. In addition or alternatively the one or more light emitters 240 can include visible light emitters.

In an embodiment, the imaging device 205 and emitter 240 are mounted on a rotating arm provided toward the forward end of the robot 200 and rearward of the spray nozzle 309. For example and without limitation, the axial distance between the spraying nozzle 309 and the imaging device 205 and UV emitter 240 can be around ten (10) inches. As shown, the imaging device 205 and UV emitter can be positioned adjacent to each other. Alternatively, the imaging device and emitter can be spaced apart in the axial direction and/or circumferential direction. The arm supporting the imaging device 205 and light emitter 240 can extend radially from a rotatable support, such as a rotating shaft 325 that extends along the pipe axis. The shaft 325 is configured to rotate about its central axis and configured to be controllably rotated by a motor (e.g., motor 340) during imaging in order to capture the 360 degree video or imagery of the surrounding pipe surface. As shown in FIG. 2, the mounting configuration enables the imaging device and UV emitter to be swept 360 degrees about the axis of the shaft 325 (also the axis of the shaft 335 extending through shaft 325) without being obstructed by or interfering with the main chassis of the robot, which is rearward of the inspection apparatus, or the spray nozzle 309 and related components that extend forward. Accordingly, during wet inspection, the robot will move from its position for coating to a position in which the camera and UV emitter are in alignment with the coated area, say, at the same axial position as the girth weld. Then, the camera is moved to the prescribed starting position, for instance, the 12 o'clock position, and controllably rotated 360 degrees to capture the entire surrounding circumference of the pipe.

In some embodiments, the coating inspection apparatus can further comprise other sensors or measurement devices 242 used for non-destructive testing of the applied coatings such as a holiday detector. As is generally known, holiday detectors are used to inspect coatings for pin holes, scratches or other coating faults. A holiday test or continuity test is one of the non-destructive test methods applied on protective coatings to detect unacceptable discontinuities such as pinholes and voids. In addition, or as an alternative to a holiday testing tool, the measurement device 242 can be in the form of dry film thickness (DFT) sensor. As is known, dry film thickness (DFT) is the thickness of a coating as measured above the substrate, for example, magnetic, magnetic induction and eddy sensors.

As shown in FIG. 1-2, the coating spray nozzle 309, the imaging device 205 and light emitter 240 are preferably mounted to the first robotic vehicle 200 at a suitable distance forward of the most forward set of wheels 203, which contact the pipe surface and support the robotic vehicle. For example and without limitation, the front wheels can be about twenty (20) inches rearward of the spraying nozzle 309. As a result, the system 100 is configured to perform various operations including, applying the coating to a weld joint area, performing inspection while the coating is wet and re-applying coating to any defective areas, without the wheels or other portions of the robotic vehicle touching the wet coating applied to the pipe surface.

In order to properly position the system 100 at the desired location (e.g., axial location) within the pipeline 10 for inspection, coating or other such processes, one or more of the robotic devices (e.g., first robotic device 200, second robotic device 400 or third robotic device 500) can comprise a positioning system. For example, and without limitation, in an embodiment, the first robotic platform 200 can comprise a positioning system that can include wheel encoders 201 and a distance sensor 119 as shown in FIG. 3. Wheel encoders can be used to provide accurate position estimate of the crawler or its components from a reference location (e.g., the entrance of the pipeline 10). However, if the wheels of the robotic devices slip for any reason, position estimates can become wrong and unreliable. Accordingly, in an embodiment, a distance sensor 119, such as a 1D LIDAR sensor, can be used to provide position estimates of the system 100 that are not affected by wheel slippage. In addition or alternatively, the positioning system can comprise position sensors such as a GPS sensor or other suitable absolute or relative position sensing system.

Encoder measurements and/or other distance or position sensor measurements can be combined to provide accurate position measurements of the system 100 with respect to the pipe opening, weld joint or other reference point or point of interest. The position measurements can be used to: (1) provide accurate position estimates for detected defects; and (2) automatically position the coating apparatus for accurate coating of uncoated weld joints as well as accurate localized re-coating of any detected defects. Thus, in some embodiments, the distance or position sensing devices can be in communication with the processor 210 or other remote device (e.g., main controller 130) and the drive mechanism can be operated in view of the information provided by the distance sensor 119.

Prior to any coating application, surface preparation is often required. Abrasive blast cleaning can be critical to the integrity and performance of the applied coating system. The process ensures the steel substrate is prepared to the required standard of cleanliness whilst providing an anchor profile for coating adhesion. As described herein, part of the process of coating and inspecting the weld joint 20 can involve surface preparation of the weld joint surface using traditional surface preparation techniques, such as grit blasting and cleaning. Accordingly, in an embodiment, the system 100 can thus comprise a second robotic device 400 including a surface preparation tool 405, for example, in the form of a grit blasting tool and a complementary vacuum. In an embodiment, during the cleaning operation, the system is moved such that the preparation tool 405 is positioned in relation to the uncoated weld joint 20 and surrounding area 22 and the blaster (not shown) is aimed at the surface area to be prepped. In response to an instruction to commence, say, a user input received via the main controller, blasting is performed over the weld joint area using the blaster. Once the surface is roughened, the preparation tool 405 can be configured to place the vacuum/blower nozzle (not shown) on the weld joint to suck up debris generated during the blasting operation and/or blow such debris from the area to be coated.

It should be understood that the second robotic device 400 and the third robotic device 500 can comprise various components, such as controllers, motors, sensors and other devices for implementing their respective features and functions. Additionally, one or more camera devices and light emitters can be provided on the first, second and/or third robotic device and configured to provide a live video feed to the operator's main controller 130 to facilitate remote control and monitoring of the various operations.

Figure 5:
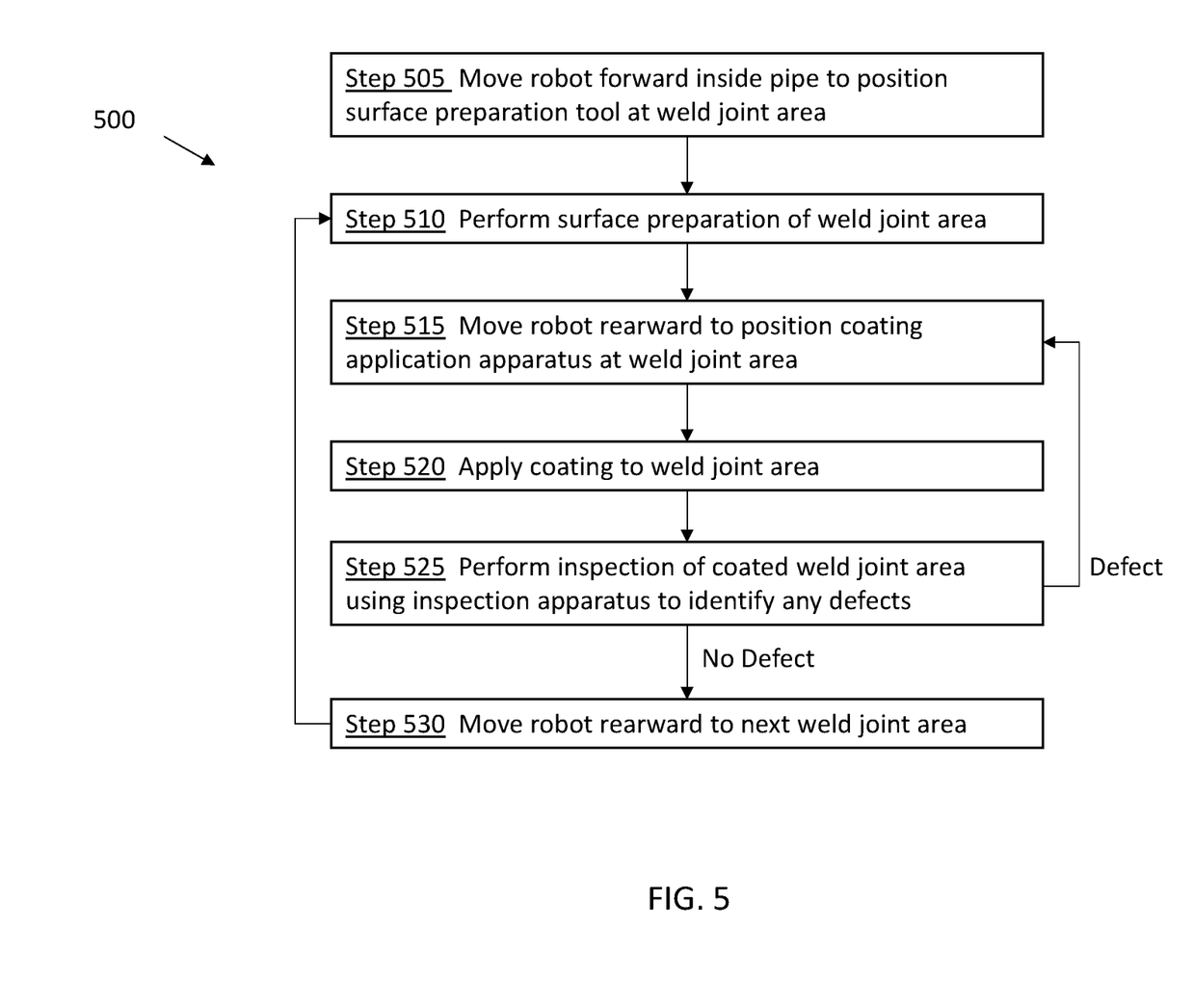
FIG. 5 is a flow diagram illustrating a routine for coordinating and executing specific tasks required to complete the coating and inspection of welds inside pipes using the system of FIGS. 1-4, according to an embodiment.

FIG. 5 is a process flow diagram illustrating an exemplary routine 500 for coating and wet inspection of weld joints in an offshore pipeline installation project using the system 100 according to an embodiment. At step 505, the robot is moved forward inside the pipe to a position at which the second robotic device 400 including the surface preparation tool 405 is positioned in relation to the weld joint area (e.g., joint 20 and area 22) to be coated. As can be appreciated, moving the second robotic device 400 into position at the weld joint means that the first robotic device 200 including the coating application apparatus 300 and inspection apparatus 230 has already traveled over the weld joint in the forward direction. At step 510, a surface preparation and cleaning operation is performed on the weld joint using the surface preparation tool 405. Once the cleaning is completed, at step 515, the robot is controllably driven backward to a position at which the first robotic device 200, particularly, the spraying nozzle 309 is aligned relative to the weld joint and/or surrounding uncoated pipe surface. At step 520, the coating apparatus 300 applies the coating including the fluorescent pigment on the weld joint and surrounding area using the spray nozzle 309. In some embodiments, the step of coating the weld joint and surrounding area can include controllably moving one or more of the first robotic device 200 and the coating nozzle 309 within the pipeline.

At step 525, the inspection apparatus 230 comprising the UV light emitter 240 and the imaging device 205 (e.g., a camera configured to capture 360 degree imagery) is used to perform inspection of the wet coating. The UV emitter is configured to illuminate the surrounding coated pipeline surface with UV light while the camera is configured to capture a live 360 degree image feed (e.g., video) of the surrounding coated surface that is transmitted to an operator's control station (e.g., main controller 130) for display in near-real-time on a display device (e.g., user interface 139) and to enable visual inspection of the wet coating surface. As noted, wet inspection is enhanced through application of the coating including the fluorescent pigment and use of the UV emitter and camera capturing a live 360 degree video feed of the wet coated surface.

In some embodiments, performing inspection can require moving one or more of the first robotic device 200 and the camera before or during the imaging of one or more portions of the weld joint area. For example, in an embodiment, positioning the camera to capture images for inspection can require moving the first robotic device 200 forward from its location for coating such that the camera is axially aligned with the weld joint. By way of further example, positioning the camera during imaging can comprise moving the robotic device in one or more directions within the pipe, say, to move the camera between a proximal end of the coated weld joint area 22 and the distal end.

The coating and inspection operation for the weld joint can be complete upon receiving an input from the operator indicating the result of inspection is an approval of the coated surface, which can be input via the user interface 139 of the main controller 130. Upon receiving a result that the inspection is complete and approved the system 100 can be configured to, at step 530, drive backwards in the pipe to the next weld joint in the pipeline and repeat steps 410-430 for that next weld join. However, in the event the result of inspection is the identification of a defect, the system 100 can be configured to re-coat one or more portions of the weld joint area 22 by repeating one or more of steps 415-425.

In an embodiment, if a defect is identified during inspection, the particular location of the defect can be recorded for localized re-coating of the defect and without recoating the entire weld joint area 22. More specifically, the main controller 130 can be configured to receive an input from the operator via the interface 139 identifying a portion of the 360 degree image feed at which if a defect is located. The controller can be configured to translate the particular location of the defect within the image to an actual position within the pipe based on the known axial position of the robotic vehicle, the location of the defect within the image and the known configuration of the camera (e.g., field of view and distance from the pipe walls). For example, the images, which depicts a 360 degree swath of the pipe surface having an axial length, can be overlaid with a coordinate grid for translating the position of a defect within the image into a location within the pipe, say, a circular position coordinate (e.g., +15 degrees relative to the 0 degree reference angle) and axial distance measurement (e.g., 2 inches forward relative to vertical axis).

After the completion of the coating and inspection of the re-coated weld joint, the pipes will be moved forward for laying in the seawater and, at step 530, the robot will move backward (i.e., the direction away from the recently coated joint toward the proximal open end) to coat and inspect the next joint.

Notably, the figures and examples above are not meant to limit the scope of the disclosed embodiments to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for coating and wet coating inspection of a weld joint in a marine pipeline, the system comprising:
   a marine pipeline anti-corrosion coating formula including a fluorescent pigment and a novolak epoxy coating formula providing corrosion protection of marine pipeline weld joints, wherein the fluorescent pigment is selected from the group consisting of zinc sulfide and cadmium sulfide, wherein the fluorescent pigment is configured to emit radiation having a predetermined wavelength in response to being illuminated with UV light;
   a remote main controller; and
   a first robotic device having:
      a body including a drive mechanism for driving the robotic device along an internal surface of the pipeline in a direction of travel, the first robotic device having a forward end and a tail end, a coating application tool supported by the body, the coating application tool comprising a spray nozzle provided near the forward end of the first robotic device and being configured to spray the marine pipeline anti-corrosion coating formula including a fluorescent pigment in at least a radial direction relative to the axis of the pipeline and onto a surrounding surface of the pipeline to apply a wet coating, wherein the spray nozzle of the coating application tool is provided at a position forward of the drive mechanism that contacts the internal surface; and an inspection apparatus supported by the body, the inspection apparatus comprising a light emitter and a camera provided near the forward end of the first robotic device and at a respective position forward of the drive mechanism that contacts the internal surface, the light emitter being configured to illuminate the surrounding surface with ultraviolet (UV) light and thereby activating the fluorescent pigment and causing the fluorescent pigment to emit radiation having the predetermined wavelength, and the camera being configured to capture a live feed of images of the surrounding surface and transmit the live feed to the remote main controller computing device for real-time display and identification of any defects in the wet coating, wherein the camera comprises an image sensor configured to sense at least radiation having the predetermined wavelength emitted by the fluorescent pigment, wherein the remote main controller comprises a computing device in communication with the first robotic device and, wherein the remote main controller is configured to cause the first robotic device to:

drive through the pipeline in a forward direction to a location of a first weld joint, apply, with the spray nozzle, the marine pipeline anti-corrosion coating formula onto the first weld joint and surrounding surface, illuminate, with the light emitter, the wet coating applied to the first weld joint and the surrounding surface, capture, with the camera, a real time feed of images depicting the wet coating applied to the first weld joint and surrounding surface, wherein the images are captured while the wet coating is illuminated and the fluorescent pigment is emitting radiation having the predetermined wavelength, transmit, the real time feed of images to the remote main controller computing device for coating evaluation, receive, at the remote main controller, a result of the coating evaluation including one or more of: an approval of the wet coating applied to a given weld joint and surrounding area and an identification of any defects in the wet coating, in response to the identification of any defects in the wet coating, cause the first robotic device to drive in a forward direction to position the spray nozzle in relation to any identified defects and repeat the applying, illuminating, capturing and transmitting steps, and in response to an approval of the wet coating, cause the first robotic device to drive in the rearward direction to a subsequent weld joint and repeat the applying, illuminating, capturing and transmitting steps for the subsequent weld joint.

2. The system of claim 1, wherein the remote main controller is configured for displaying the feed of images to an operator using a display and receiving control inputs including identification of any defects in the wet coating.

3. The system of claim 1, further comprising a second robotic device having a cleaning apparatus mounted thereto for cleaning the first weld joint, wherein the second robotic device is coupled to the tail end of the first robotic device thereby forming a train of mobile robotic devices.

4. The system of claim 1, wherein the spray nozzle, the camera and the light emitter are positioned at respective distances forward of the drive mechanism such that the first robotic device can perform coating and inspection operations without the drive mechanism contacting any wet coating applied to the first weld joint and surrounding surface.

5. The system of claim 4, wherein the camera and illumination device are mounted rearward of the spray nozzle.

6. The system of claim 4, wherein the spray nozzle is a spraying disc.

7. The system of claim 1, wherein the first robotic device comprises a crawler and wherein the drive mechanism includes a plurality of wheels on which the first robotic device is driven through the pipeline.

* * * * *